(12) United States Patent
Smith

(10) Patent No.: US 9,234,582 B2
(45) Date of Patent: Jan. 12, 2016

(54) APPARATUS AND METHODS FOR CONTROLLING HYDRAULICALLY-POWERED APPARATUS

(75) Inventor: Anthony R. Smith, Machesney Park, IL (US)

(73) Assignee: THOMSON LINEAR LLC, Marengo, IL (US)

( * ) Notice: Subject to any disclaimer, the term of this patent is extended or adjusted under 35 U.S.C. 154(b) by 1053 days.

(21) Appl. No.: 12/909,318

(22) Filed: Oct. 21, 2010

(65) Prior Publication Data

US 2011/0088384 A1     Apr. 21, 2011

Related U.S. Application Data

(60) Provisional application No. 61/253,750, filed on Oct. 21, 2009.

(51) Int. Cl.

| | |
|---|---|
| *F16D 31/02* | (2006.01) |
| *F16H 61/435* | (2010.01) |
| *F15B 11/17* | (2006.01) |
| *B62D 11/00* | (2006.01) |
| *F16H 61/00* | (2006.01) |

(52) U.S. Cl.
CPC ............ *F16H 61/435* (2013.01); *B62D 11/003* (2013.01); *F15B 11/17* (2013.01); *B60Y 2200/223* (2013.01); *F16H 2061/0078* (2013.01)

(58) Field of Classification Search
CPC   F15B 11/17; F16H 61/435; F16H 2061/0078
USPC .................. 60/406, 427, 443, 445, 484, 486; 91/506
See application file for complete search history.

(56) References Cited

U.S. PATENT DOCUMENTS

| | | | |
|---|---|---|---|
| 5,557,154 A * | 9/1996 | Erhart .............................. | 310/80 |
| 6,209,322 B1 * | 4/2001 | Yoshida et al. ................. | 60/452 |
| 6,328,127 B1 * | 12/2001 | Hori et al. ...................... | 180/333 |
| 6,955,046 B1 | 10/2005 | Holder et al. | |
| 7,024,853 B1 | 4/2006 | Holder et al. | |
| 7,073,330 B1 | 7/2006 | Hauser | |
| 7,269,945 B2 * | 9/2007 | Bae ................................ | 60/445 |
| 7,353,651 B2 * | 4/2008 | Adkins et al. .................. | 60/486 |
| 7,520,130 B2 * | 4/2009 | Tanaka et al. .................. | 60/421 |
| 8,176,865 B2 * | 5/2012 | Zanfei ..................... | 114/144 RE |
| 2003/0010199 A1 * | 1/2003 | May ................................ | 92/12.2 |
| 2007/0125078 A1 * | 6/2007 | Tanaka et al. .................. | 60/421 |
| 2009/0126361 A1 * | 5/2009 | Kakizawa et al. .............. | 60/445 |
| 2009/0298635 A1 * | 12/2009 | Kuras et al. .................... | 60/436 |

\* cited by examiner

*Primary Examiner* — Michael Leslie
(74) *Attorney, Agent, or Firm* — Cantor Colburn LLP

(57) ABSTRACT

In one aspect, the disclosure herein provides an apparatus that in one configuration includes a first hydraulic power unit for supplying a first fluid under pressure to a first chamber for controlling motion of a first movable member and a second hydraulic power unit for supplying a second fluid under pressure to a second chamber for controlling motion of a second movable member, an input device configured to provide an input signal for controlling the motions of the first and second movable members and a processor configured to: receive the input signal from the input device; and independently set, in response to the input signal from the input device, a first electrical actuator to control an amount and flow rate of the first fluid to the first hydraulic power unit and a second electrical actuator to control an amount and flow rate of the second fluid to the second hydraulic power unit for controlling the motion of the first and second movable members.

21 Claims, 4 Drawing Sheets

APPARATUS AND METHODS FOR CONTROLLING HYDRAULICALLY-POWERED APPARATUS

CROSS REFERENCES TO RELATED APPLICATIONS

This application claims priority from the U.S. Provisional patent application having the Ser. No. 61/253,750 filed Oct. 21, 2009.

BACKGROUND OF THE DISCLOSURE

1. Field of the Disclosure

This disclosure relates generally to apparatus and methods for controlling hydraulic apparatus, including vehicles, such as zero turn radius vehicles and movable members.

2. Description of the Related Art

Various types of hydraulic apparatus utilize a variety of mechanical linkage systems to control fluid supply to pumps for controlling motion of work members. Examples of such hydraulic apparatus include zero turn radius (ZTR) machines, such as lawn machines or vehicles and movable members that perform industrial operations or move other elements or devices. In the case of ZTR machines, the hydraulic driven wheels are controlled by a mechanical linkage system. Such linkage systems provide linear motion to a hydraulic bi-directional pump/motor that rotates a wheel at a given rotational speed (revolutions per minute). Such vehicles are typically fitted with custom swash plates to provide a certain "feel" to the operator (driver) of the vehicle. The swash plate restricts or provides variable flow of a hydraulic fluid to the hydraulics at different points in a linear mechanical linkage system. Typically, such vehicles require adjustment to the swash plate prior to shipping to minimize the effects of mechanical tolerances in the system and to provide a specific feel to the operator.

The mechanical linkage and lever used to rotate the swash plate on each hydraulic pump is mounted so as the operator can apply a large amount of stroke to an arm (lever) to operate the vehicle. This allows a smooth control by limiting movement with a ratio-reducing lever to the wheels, as the lever moves forward and backward. As a result, the lever requires a moderate amount of work from the operator when used for long hours of operation. Such machines typically require the operator to use separate levers for each wheel of the vehicle. Such machines also do not offer adequate speed and acceleration control options for different skill levels of the operators and thus adequate safety for relatively inexperienced operators. Such vehicles typically do not include adequate in-situ calibration methods and thus can remain out of calibration until a service is performed.

Thus, there is a need for an improved apparatus and methods that address at least some of the above-noted needs.

SUMMARY

In one aspect, the disclosure herein provides an apparatus that in one configuration includes a first hydraulic power unit for supplying a first fluid under pressure to a first chamber for controlling motion of a first movable member and a second hydraulic power unit for supplying a second fluid under pressure to a second chamber for controlling motion of a second movable member, an input device configured to provide an input signal for controlling the motions of the first and second movable members and a processor configured to: receive the input signal from the input device; and independently set, in response to the input signal from the input device, a first electrical actuator to control an amount and flow rate of the first fluid to the first hydraulic power unit and a second electrical actuator to control an amount and flow rate of the second fluid to the second hydraulic power unit for controlling the motion of the first and second movable members.

In another aspect, a method of controlling a pair of independently-operated hydraulic power devices is provided that in one configuration may include: providing an electrical input signal corresponding to a supply of a first hydraulic fluid under pressure to a first hydraulic power device and a supply of a second hydraulic fluid under pressure to a second hydraulic power device; and independently controlling a first electro-mechanical actuator configured to control an amount and flow rate of a first fluid to a first chamber associated with the first hydraulic power device and control a second electro-mechanical actuator to control an amount and flow rate of a second fluid to a second chamber associated with the second hydraulic power device.

Examples of certain features of apparatus and methods have been summarized rather broadly in order that the detailed description thereof that follows may be better understood. There are, of course, additional features of the apparatus and method disclosed hereinafter that will form the subject of the claims made pursuant to this disclosure.

BRIEF DESCRIPTION OF THE DRAWINGS

For detailed understanding of the present disclosure, reference should be made to the following detailed description taken is conjunction with the accompanying drawings in which like elements have generally been given like numerals and wherein.

DETAILED DESCRIPTION OF THE EMBODIMENTS

This disclosure relates to apparatus and methods for controlling hydraulic apparatus. Such hydraulic apparatus may include any device or machine that utilizes a hydraulic power device, such as a pump for supplying a hydraulic fluid under pressure to control the motion of a member, such as a wheel of a vehicle, a rotary member, a mechanical arm, etc. The various aspects of the this disclosure are described herein in reference to a vehicle for purposes of explanation only and not, in any way, to limit the applications of the concept described herein to the disclosed embodiments.

Figure 1:
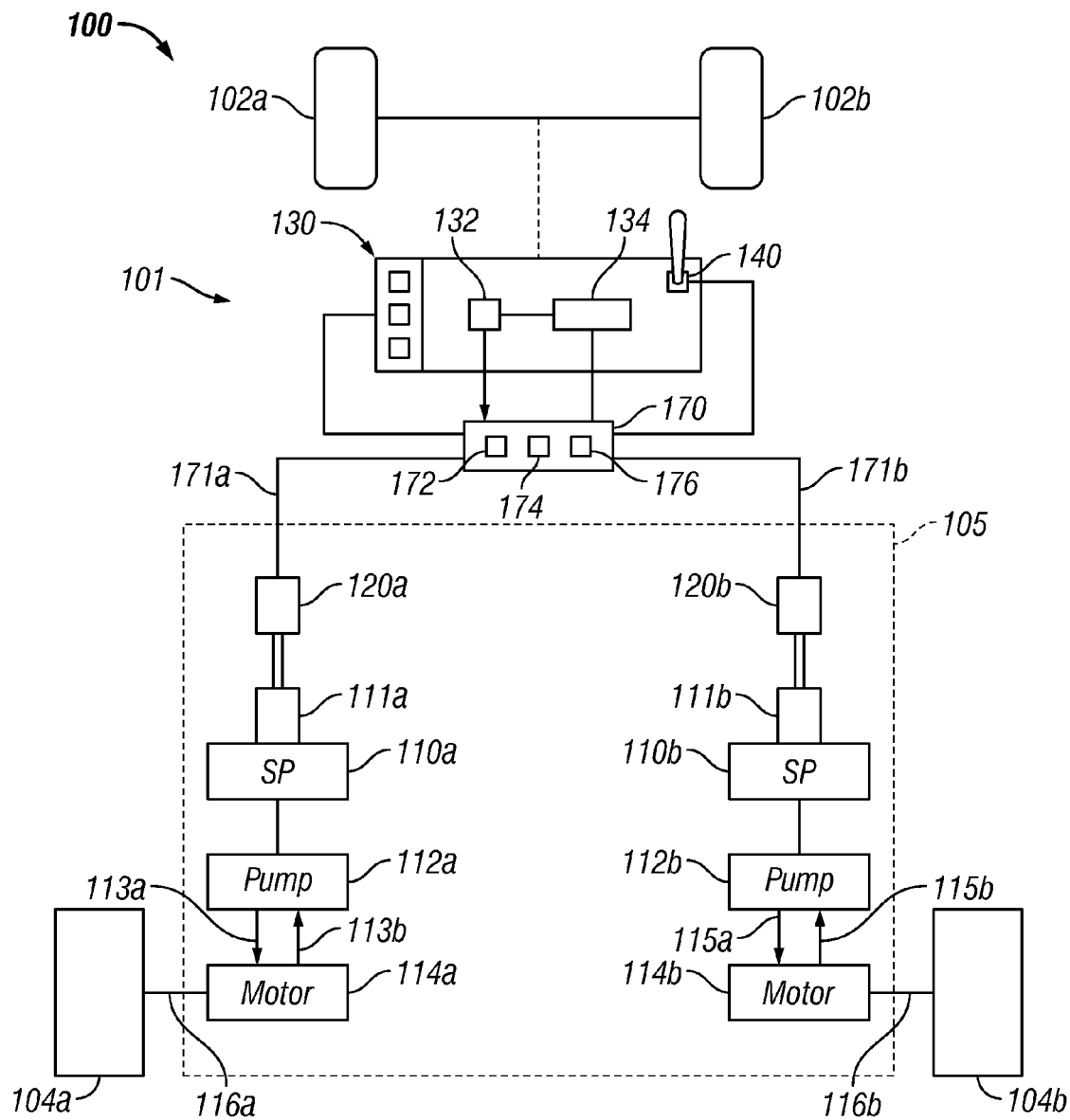
FIG. 1 is a schematic diagram of an embodiment of a vehicle with a drive control system, according to one embodiment of the disclosure.

FIG. 1 is a schematic diagram of an exemplary hydraulic apparatus 100 that includes a control system or unit 101 that controls a drive unit 105 for controlling the operation of the hydraulic apparatus 100. In the particular configuration of FIG. 1, the hydraulic apparatus is shown to be a vehicle, which may be a lawn mower, construction vehicle, utility vehicle, etc. The control system 101 is shown coupled to a frame of the vehicle 100. The vehicle 100 is shown to include front wheels 102a and 102b and rear wheels 104a and 104b. As depicted, the rear wheels 104a and 104b are driven by a drive unit 105 (enclosed by the dashed lines). In one aspect, the drive unit 105 provides independent control of each wheel 104a and 104b, enabling directional and speed control of the vehicle 100. The drive unit 105 may include any suitable hydraulic power unit for rotating or driving wheels 104a and 104b. In one aspect, the drive unit 105 may include two sets of components that may be configured to independently control the drive of wheels 104a and 104b.

In one embodiment, the drive unit 105 includes swash plates 110a and 110b coupled to and moved by control arms control 111a and 111b. The control arms 111a, 111b are also coupled to actuators 120a and 120b configured to respectively control movement of the swash plates 110a, 110b. In one aspect, the actuators 120a and 120b may be linear or non-linear electro-mechanical actuators. The movements and position of swash plates 110a and 110b control the flow of a hydraulic fluid from hydraulic pumps 112a and 112b, respectively. In the drive unit 105 the hydraulic pump 112a is connected, via lines 113a and 113b, to a hydraulic motor 114a. Lines 113a and 113b provide closed-loop fluid communication for the pump 112a. Similarly, the hydraulic pump 112b is connected, via lines 115a and 115b, to a hydraulic motor 114b. Lines 115a and 115b provide closed loop fluid communication for the pump 112b. The hydraulic motors 114a and 114b respectively drive wheels 104a and 104b via drive shafts 116a and 116b. In aspects, the actuators 120a, 120b may be independently controlled to affect the amount of fluid and the flow rate of the fluid to the pumps 112a and 112b, and therefore power, sent from the pumps 112a, 112b to hydraulic motors 114a, 114b. For example, the drive unit 105 may be controlled to drive wheel 104a forward while keeping the wheel 104b stationary or neutral (or rotating at a lower speed than wheel 104a), thereby changing the vehicle's direction (turning right in this case), using the drive control system 101. In such a control system 101, the front wheels 102a and 102b may serve to only support the frame. Further, the front wheels 102a, 102b may be capable of turning in any direction and be of any suitable type, such as caster-type wheels.

In aspects, the direction and speed in which the control system 101 moves the vehicle 100 may be controlled by a control unit 170 operatively coupled to the actuators 120a, 120b by suitable lines (such as electrical leads) 171a and 171b, respectively. The control unit 170, in aspects, may include a controller or processor 172 (such as a microprocessor), a data storage device 174, such as a memory device accessible to the processor 172, and software (also referred to as code) and data 176 accessible to the processor, to control the operation of the vehicle 100. The control unit 170 is powered by a suitable power source, such as a battery 134. The control unit 170 receives inputs from a speed/acceleration selector (also referred to as a limit selector) 130, input device 140 and actuators (120a, 120b). An operator sets the top speed and acceleration rate of the drive unit 105 by selecting an appropriate setting on the speed/acceleration selector 130. In aspects, the speed/acceleration selector 130 may include two or more settings (settings designated by 130a, 130b, 130n) configured to set maximum speed, acceleration and other properties (such as turning radius, etc.) of the vehicle 100. As depicted, the speed/acceleration selector 130 includes a single input device, such as a button or a switch that enables an operator to select among settings such as beginner, intermediate, expert, etc. Accordingly, the control unit 170 and software 176 use the input from selector 130 to control the acceleration rate for the hydraulic motors (114a, 114b) and thus the wheels (104a, 104b). For example, a beginner setting may cause the electromechanical actuators (120a, 120b) to slowly move the swash plate (110a, 110b) enabling increased hydraulic fluid flow to the motor (114a, 114b), thereby causing a slower acceleration of wheels (104a, 104b). In addition, the beginner setting of selector 130 may also limit the top speed of wheel rotation. In embodiments wherein the drive control system 101 is located on the vehicle, a slow increase in wheel speed may be desirable to prevent rapid movements of the wheels. Further, rapid increases in wheel speed may cause the wheels (104a, 104b) to destroy the turf below the vehicle 100. The speed/acceleration selector 130 settings may be used to determine several user-dependent performance characteristics, including acceleration and top speed of the vehicle. The processor 172 using the software and data may determine appropriate performance characteristics for each setting based on factory-programmed data and/or operator-defined limits.

The control unit 170 receives user inputs from the speed/acceleration selector 130 and the input device 140 to determine a direction and speed for the control system 101. In one aspect, the input device 140 may be a dual axis electro-mechanical joystick, wherein the input device 140 may be moved in the x and y directions, thereby enabling concurrent control of both rear wheels 104a and 104b. In other embodiments, the input device 140 may be any suitable mechanism to control direction and rate of movement of the wheels, such as a dual-axis joy stick or two single-axis electronic joysticks, wherein each electro-mechanical actuator 120a and 120b corresponds to a combination of each axis of the two single-axis joysticks. Other input devices, such as electronic touch pads or any other suitable input device, may be utilized as an input device. The input device 140 may be positioned anywhere on the vehicle so that the operator may control direction and speed of the vehicle. The control system 101 may also include a safety switch 132 configured to prevent the vehicle from moving when the safety switch is in a selected position, such as an off position. The safety switch 132 may be controlled by an operator or it may be placed at a suitable location such that it is activated or tripped when a precondition or selected condition or activity occurs, such as an operator occupying the seat of the vehicle. The operation of safety switch 132 is discussed below in with respect to FIG. 5.

The control unit 170 may include software that enables the processor 172 to perform calibration of the input device 140, actuators 120a, 120b and thus the wash plates 110a, 110b and other drive unit 105 components. Calibration of the drive unit 105 components is discussed in FIG. 4. The control unit 170 may include one or more processors 172 (such as microprocessors), data storage devices 174 (such as memory units, including a flash memory, read-only-memory (ROM), a random-access-memory (RAM), an erasable-programmable read only memory (EPROM), flash memory, disk, etc.). The software 176 (also referred to as a program or machine code) may include, but is not limited to, programmed instructions, models, algorithms, neural networks, firmware, other suitable computer programs and routines. Data may include any suitable data for use by the control system 101, but, is not limited to, operating parameters relating to the components of the hydraulic apparatus 100, measured values, stored values, current values and historical data. The control unit 170 also may include circuits and other associated hardware and machine code to communicate with and control components of the control system 101, including actuators 120a and 120b and input device 140. In another embodiment, the control system 101 includes, but is not limited to, the control unit 170, processor 172, memory 174, software 176, selector 130, input device 140, safety switch 132, power source 134, lines 171a and 171b, as well as actuators 120a and 120b.

In one embodiment, the control system 101 may be used to drive a zero turn radius (ZTR) vehicle, such as lawn mower. In a ZTR mower, it is desired to move each of the rear wheels forward and backward independent of the other and also move one rear wheel at a different speed than the speed of the other rear wheel. A ZTR vehicle may utilize a combustion engine to drive a mower deck and power the hydraulic pumps (112a, 112b). The engine may run at a constant high speed or revolutions-per-minute (RPM) to rotate blades of the mower at high speed. In an embodiment, the actuators 120a, 120b receive control signals from the control unit 170 via lines 171a and 171b that control the amount of pressurized fluid to be sent from the hydraulic pumps 112a, 112b to drive the motors 114a, 114b. The lines 171a and 171b may have bi-directional communication lines, wherein the control unit 170 also receives the actuator positions from sensors associated with the actuators 120a, 120b. The high rotational speed of the motor allows the cutting blades to turn at ideal cutting speed while the control unit 170 and actuators 120a and 120b can individually limit the effective rotational speed and acceleration to the hydraulic pumps providing wheel rotation. In the current mowers, to slow the speed of the wheels down the user slows the engine rotational speed down, which slows the cutting blade down that can result in a bad cut. The system described herein can allow the blade to be at optimum speed while still controlling the machines overall speed. In the configuration shown in FIG. 1, the control system 101 uses processors 172, storage devices 174, software 176 and electro-mechanical components, such as input device 140 and actuators 120a and 120b, to calibrate the various components of the system 100, perform safety checks and set speed and acceleration limits to selected levels. Such a system avoids the use of some mechanical linkages, reduces cost and reduces maintenance, while enabling enhanced operation and control of the drive unit 105 and the vehicle. Although FIG. 1 shows the control of two independently controllable hydraulic devices, the system described herein equally applies to control of one or more than two hydraulic devices. Also, the input device described is a dual-axis joy stick, any other suitable input device may be utilized and such a device may include input relating to more than two axes. Furthermore, the control system may control one or more hydraulic devices using programmed instructions only or such instructions in conjunction with an input device. Programmed instruction may include a method or sequence of steps controlled by the controller to automatically or semi-automatically control one or more hydraulic devices.

Figure 2:
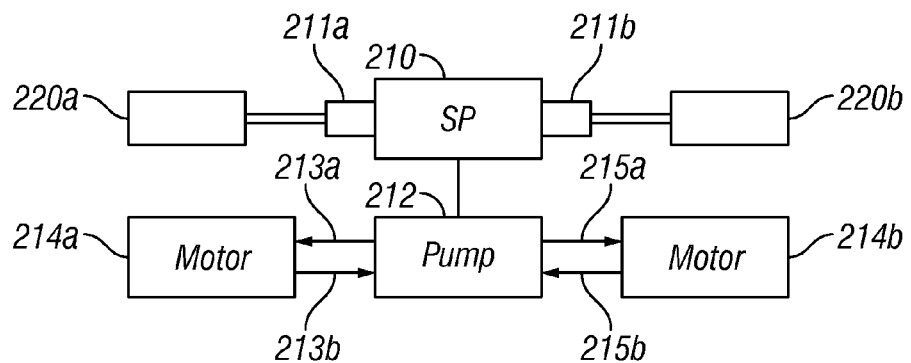
FIG. 2 is a schematic diagram of another embodiment of drive unit for use in the system of FIG. 1, according to one embodiment of the disclosure.

FIG. 2 is a schematic diagram of another embodiment of components that may be included in the drive unit 105 from FIG. 1. As depicted, the control unit 170 (FIG. 1), may send signals to control actuators 220a and 220b to drive wheels 104a and 104b. The actuators 220a, 220b are coupled to control arms 211a and 211b, wherein each is used to individually control the position of two swash plates 210. The position of each swash plates 210 control the amount of hydraulic fluid that flows from a shared hydraulic pump 212 to the motors 214a and 214b. Each swash plate 210 is coupled to, or located within, a housing coupled to the hydraulic pump 212. The lines 213a, 213b, 215a and 215b provide fluid communication between motors 214a and 214b and the pump 212. In aspects, the shared pump 212 and swash plates 210 independently control fluid flow and power to wheels (not shown) attached to motors 214a and 214b. As compared to a system with two hydraulic pumps (FIG. 1), this arrangement may be lower cost and less complex due to a reduction in the number of pumps. In the depicted embodiment, the actuators 220a, 220b receive control signals from the control unit (170, FIG. 1) to independently control and drive the motors 214a, 214b. The shared pump 212 may be a large capacity pump, as compared to those shown in FIG. 1. Similar, to those shown in FIG. 1, the hydraulic motors 214a, 214b may be of any suitable size and capacity.

Figure 3:
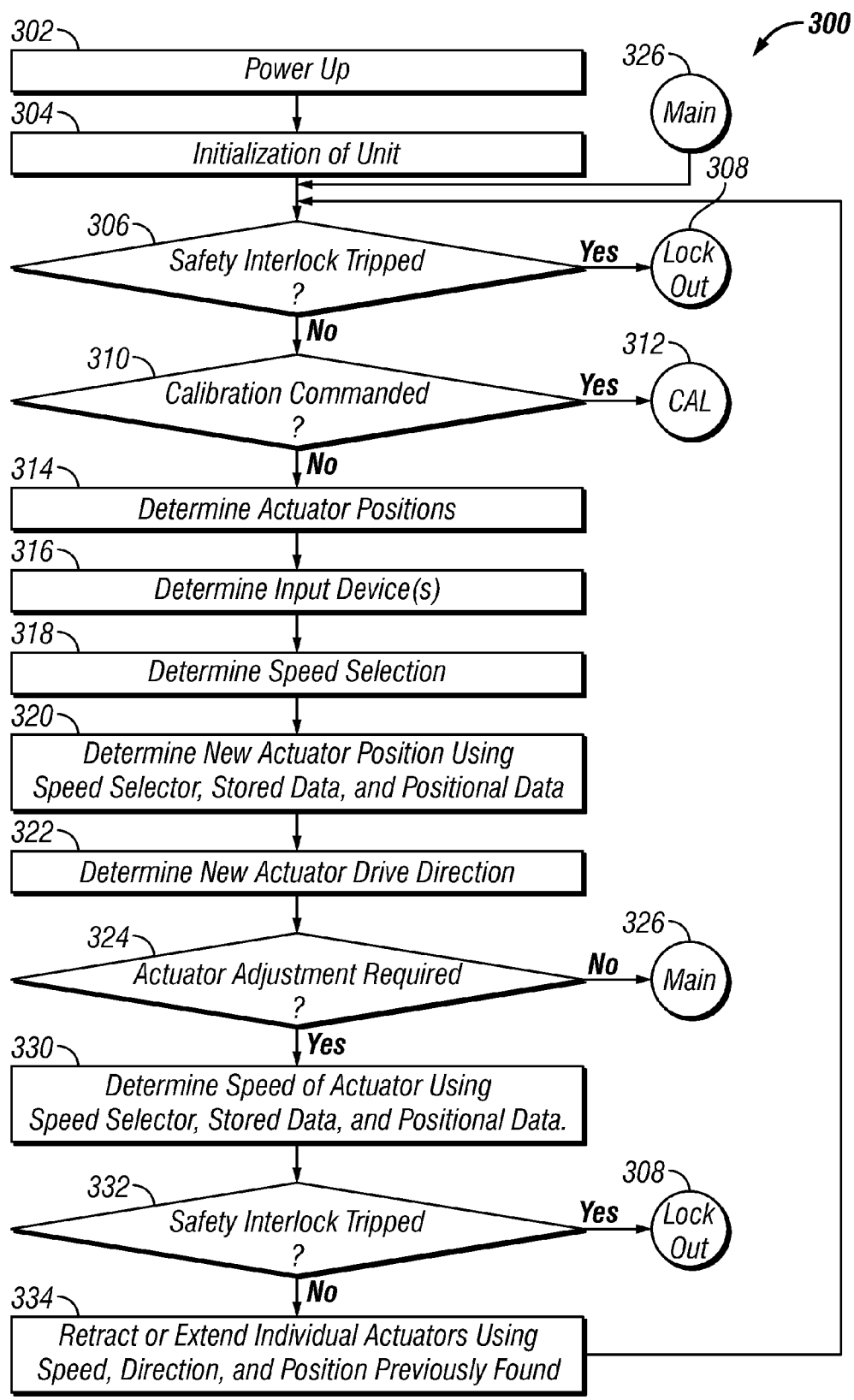
FIG. 3 is a flow diagram of an exemplary control system for use in a drive system, such as the system shown in FIGS. 1 and 2, according to one embodiment of the disclosure.

FIG. 3 is a flow diagram 300 of an exemplary control system for use in a drive system, as shown in FIGS. 1 and 2. As the control system 101 is powered on (Block 302), such as by turning an ignition key or pushing an activation or start button by an operator, the control unit 170 initializes the control system 101 by monitoring the settings of the control unit's inputs and outputs. The control unit 170 sets up using inputs, including the current positions of the input device, actuators along with as well as previous calibration data stored in the memory (Block 304). The position of the speed/acceleration selector and the joystick are among the inputs during initialization of the system. The control unit determines whether the safety interlock switch has been tripped (Block 306). In an embodiment, the interlock switch includes, or is coupled to, suitable sensor, including, but not limited to, a seat sensor that may be a weight sensor, an engine kill switch or another suitable switching device. The interlock switch may trip when no weight is sensed on the operator seat, causing the system to proceed to lock out system 101 (Block 308), as discussed in detail in FIG. 5. If the safety interlock switch is not tripped, meaning that an operator is sensed in the seat, the system proceeds to determine whether calibration has been commanded by the operator (Block 310). In aspects, the system 300 continuously monitors the safety interlock switch during operation of the control system 101 and, if at any time the interlock switch is not tripped, the control unit returns the actuators, swash plates and, therefore, the wheels to an idle or neutral position. As shown in Block 310, the control unit 170 checks whether calibration has been selected or commanded. If so, the control unit performs the calibration routine for the system's actuators, discussed in more detail in reference to FIG. 4. In addition, the control unit 170 may enable the operator to perform a calibration of the input device 140, such as the joystick. The control unit processor 172 may correlate various positions of the joystick to corresponding positions of the actuators, which are used to control drive speed and direction.

If calibration has not been commanded (Block 310), the control unit 170 reads the actuators' position (Block 314) and input device position (Block 316). The input device may be the joystick or another appropriate device that enables the operator to control vehicle movement. The control unit 170 also reads the setting for the acceleration/speed selector. The processor 172, using the software 176, determines acceleration rates and maximum speed for the drive system. The control unit 170 then determines the new position(s), if any, for the actuators 120a, 120b, based on the acceleration/speed selector, input device 140 position, stored calibration data, any models or algorithms and current actuator positions (Block 320). The processor 172 then determines the actuator drive direction (Block 322). In an aspect, the actuator drive direction may be determined to be a left turn (for example about 15 degrees), causing the drive system to drive the right wheel at a faster rate than the left wheel. The control unit 170 and software may use several inputs and stored information to determine the proper settings that correspond to the actuator drive direction. As shown in Block 324, the control unit 170 determines if new actuator positions require an adjustment of the actuator position. If not, the controller 170 loops the routine back to the beginning (Block 328). If an adjustment of the actuator is required, the speed of the actuator movement and corresponding vehicle acceleration is determined by using the acceleration/speed selector, stored data and positional data, as indicated at Block 330. In turn, the speed of the actuator movement affects the acceleration of the vehicle. In an embodiment, the actuators may be electromechanical devices that receive electrical control signals from the control unit. The signal may be a Pulse Width Modulation (PWM) signal with a duty cycle that varies depending on the desired vehicle speed and movement. The duration of the duty cycle may slowly increase or "ramp up" to a desired duration, causing a controlled movement of the actuator and, therefore, acceleration of the motor that drives each wheel. For example, referring to the embodiment of FIG. 1, the control unit 170 may generate PWM signals to control the movement of the actuators 120a, 120b, thereby controlling the movement of the swash plates 110a, 110b and the amount of the fluid that powers the movement of each wheel 104a, 104b.

The control unit continues to check if the safety interlock has been tripped (Block 332). If it is tripped, the routine proceeds to lock out step 308, which is discussed in detail with respect to FIG. 5. If the safety interlock is not tripped, control unit retracts or extends the actuators (Block 334). The actuators are independently retracted or extended based on the determined actuator position, drive direction and drive speed from prior steps in the drive system routine. Further, the processor and software to control the movement of the actuators ensures the vehicle speed and direction are under control. After moving the actuators, the routine loops back to proceed to monitor the safety interlock (Block 306). The various programmed instructions for the routine may be stored in the memory accessible to the processor to perform the steps or methods of the routine. Each of the Blocks may include subroutines and logic to perform the step. In addition, the routine, steps and subroutines may produce corresponding electrical or electronic control signals to cause corresponding movements of the drive unit, thereby rotating the vehicle drive wheels at a desired rate.

Figure 4:
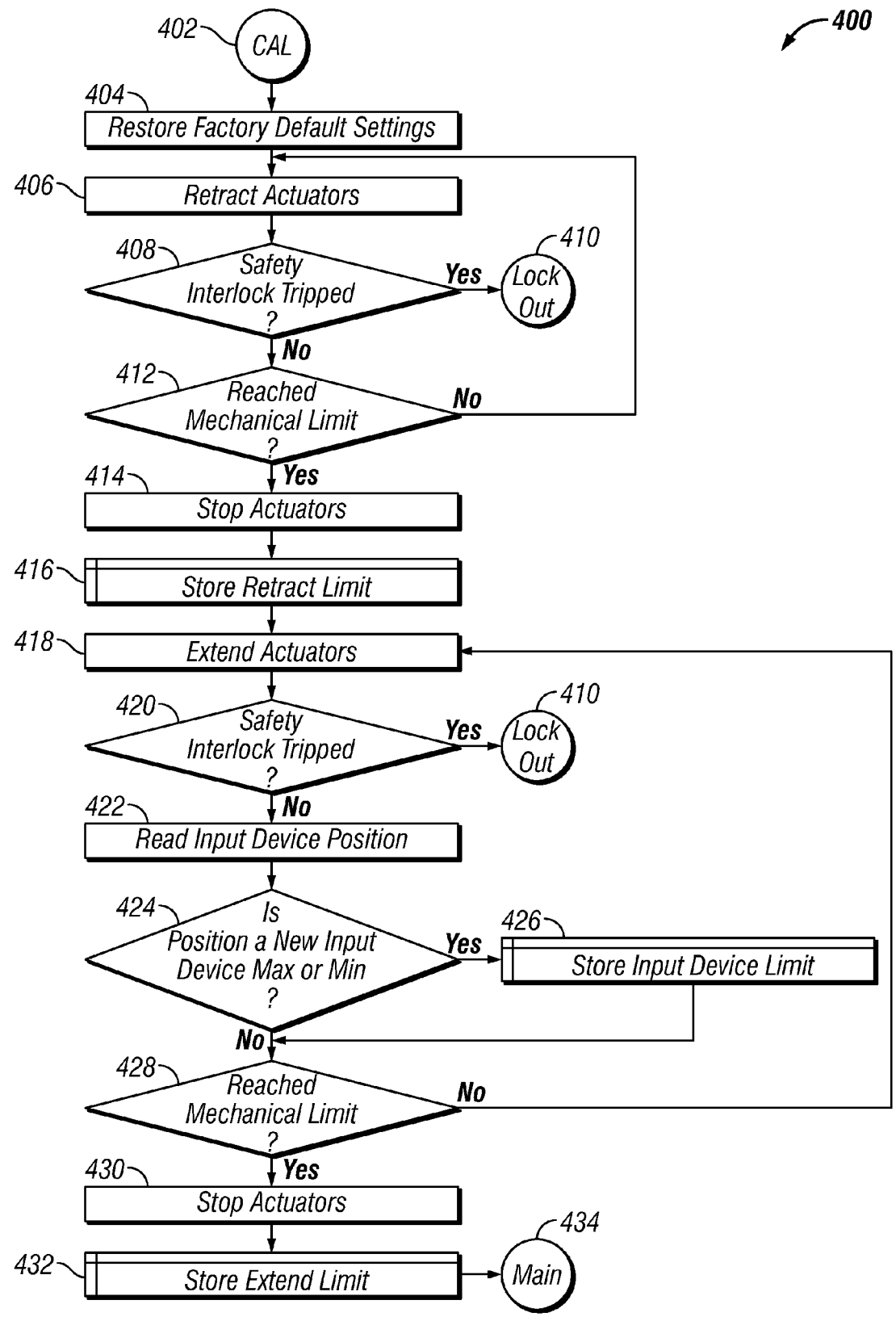
FIG. 4 is a flow diagram of an exemplary calibration routine for a drive system, such as that shown in FIG. 1, according to one embodiment of the disclosure.

FIG. 4 is a flow diagram of an embodiment of a calibration routine 400 for a drive system, such as that shown in FIG. 1. The calibration routine includes a series of functional blocks that calibrate electromechanical devices in the drive system, such as the input devices and actuators. In an aspect, the calibration routine 400 adjusts the control of the drive unit actuators to correspond with the range of movements of the input devices. In step 402, the operator begins the calibration routine by pressing a calibration button or switch. In step 404, the control unit restores the system settings to default settings set at the factory. For example, a control unit may establish default settings for limits of input devices and actuators at a factory location. The factory default settings may be permanently stored in a memory, wherein the settings serve as a baseline to begin the calibration routine 400. In one aspect, the settings may be nominal values for the maximum and minimum that result in the drive unit having a limited range of motion/movement. For example, a joystick that has a specified output range of 0-3 Volts (V), with 1.5V being idle, may have a range of factory default settings of 1.3V minimum and 1.7V maximum. This limited range provides a baseline range of values that will prevent high speed movement of the drive unit and will be expanded during the calibration routine. It should be noted that the specific voltage and other values used herein are for explanation purposes only and are not to be considered as limitations. In an embodiment, as a safety feature, the calibration routine is performed when the hydraulic pump(s) are not running. In an aspect, the calibration switch or button may be routed through the vehicle ignition switch, wherein the calibration switch is powered only when the ignition switch is turned off. In another aspect, when the calibration switch is in the pressed state (Block 402), the control unit determines whether the engine is running. If so, the control unit 170 sends a signal to stop the engine or causes the calibration routine to proceed to Block 326 (FIG. 3).

Referring again to FIG. 4, the actuators 120a and 120b are retracted in Block 406. The retracting actuators move the swash plates in a first direction. As discussed above, movement of the each of the actuators causes movement of the corresponding swash plate. Therefore, by calibrating the actuator range of motion, the routine 400 calibrates the range of motion for the attached swash plate. Accordingly, the range of hydraulic fluid flow rate controlled by the swash plate is also established. After retracting the actuators, the control unit monitors the safety interlock to determine whether it has been tripped (Block 408). Elements of the safety interlock operation are discussed in detail below. If the safety interlock has been tripped, the drive system locks the wheels to prevent further vehicle movement (Block 410). If the interlock is not tripped, Block 412 determines if the mechanical limit of the actuator and/or the swash plate movement has been reached. In aspects, the range of motion for the swash plate is less than that provided by the range of motion of the actuator and control arm. As a result, the mechanical limit of swash plate movement may occur while the actuator has 5% or more of its retraction remaining. If the actuator retraction has not reached the mechanical limit of the swash plate, the routine loops back to Block 406. If the actuator retraction has reached the mechanical limit of the swash plate, then the routine proceeds to stop the actuators movement (Block 414). The mechanical limit of the swash plate is the maximum the plate can move in a selected direction. The mechanical limit of the swash plate movement in the first direction corresponds to the maximum speed that the drive wheels can rotate in a first direction. After reaching the mechanical limits, the actuators' positions at the mechanical limits are stored in a memory of the control unit (Block 416). This provides an updated calibration of the maximum retraction position for the drive unit that is stored by the control unit. In an aspect, the actuator retraction limit may correspond to value for: a length of actuator extension, angle of swash plate movement, voltage sent to reach the maximum retraction position or any combination thereof.

Still referring to FIG. 4, the actuators 120a and 120b of the drive unit 105 are then extended in Block 418. Extending the actuators move the corresponding swash plates in a second direction. The control unit monitors the safety interlock to determine whether it has been tripped (Block 420). The operation of the safety interlock operation is discussed in detail with respect to FIG. 5. If the safety interlock has been tripped, the drive system locks the wheels to prevent further vehicle movement (Block 410). If the interlock is not tripped, Block 422 reads the position of the input device(s), which may be a joystick and/or other suitable user control. Blocks 422, 424 and 426 may be performed at any point in the calibration routine. For convenience, the operator may be prompted, by an indicator or warning light, to move the input device to a minimum or maximum of its range while the actuators are extending. The control unit determines whether position of the input device is at a maximum or minimum of the device (Block 424). For example, a dual-axis joystick may reach its maximum limit for a forward direction of the vehicle by pressing the joystick as far forward as the device allows. This enables the control unit to calibrate the maximum forward speed to the corresponding joystick position. In addition, the same commands, operator movements and corresponding input device positions may be used to set the device minimum and other device limits. If the input position is a device maximum or minimum, then the limit is stored (Block 426). If the position is not a device limit, the routine proceeds to Block 428. The control unit determines whether the mechanical limit of the actuator or the swash plate has been reached during extension (Block 428). If the actuator extension has not reached the mechanical limit of the swash plate, then the routine loops back to Block 418. If the actuator extension has reached the mechanical limit of the swash plate, then the routine stops the actuator movement (Block 430). The mechanical limit of the swash plate movement in the second direction corresponds to the maximum speed the drive wheels can rotate in the second direction. After stopping the actuator movement, the actuators' positions at the mechanical limits are stored in a memory of the control unit (Block 432). This provides a calibration of the maximum extension position for the drive unit, which is stored by the control unit. After performing the calibration, the drive system may return to the main routine of FIG. 3 (Block 434). The limits and values from the calibration routine may be saved in the memory for use by the control unit during operation. The calibration routine 400 may include additional steps for drive units with different configurations, wherein the calibration provides precise user control of the drive system using one or more input devices. In addition, the calibration routine may involve additional or different calibration steps depending on the number of wheels driven and the type of input device being used. The steps may include subroutines that are stored in the system memory and run by the control unit processor.

Figure 5:
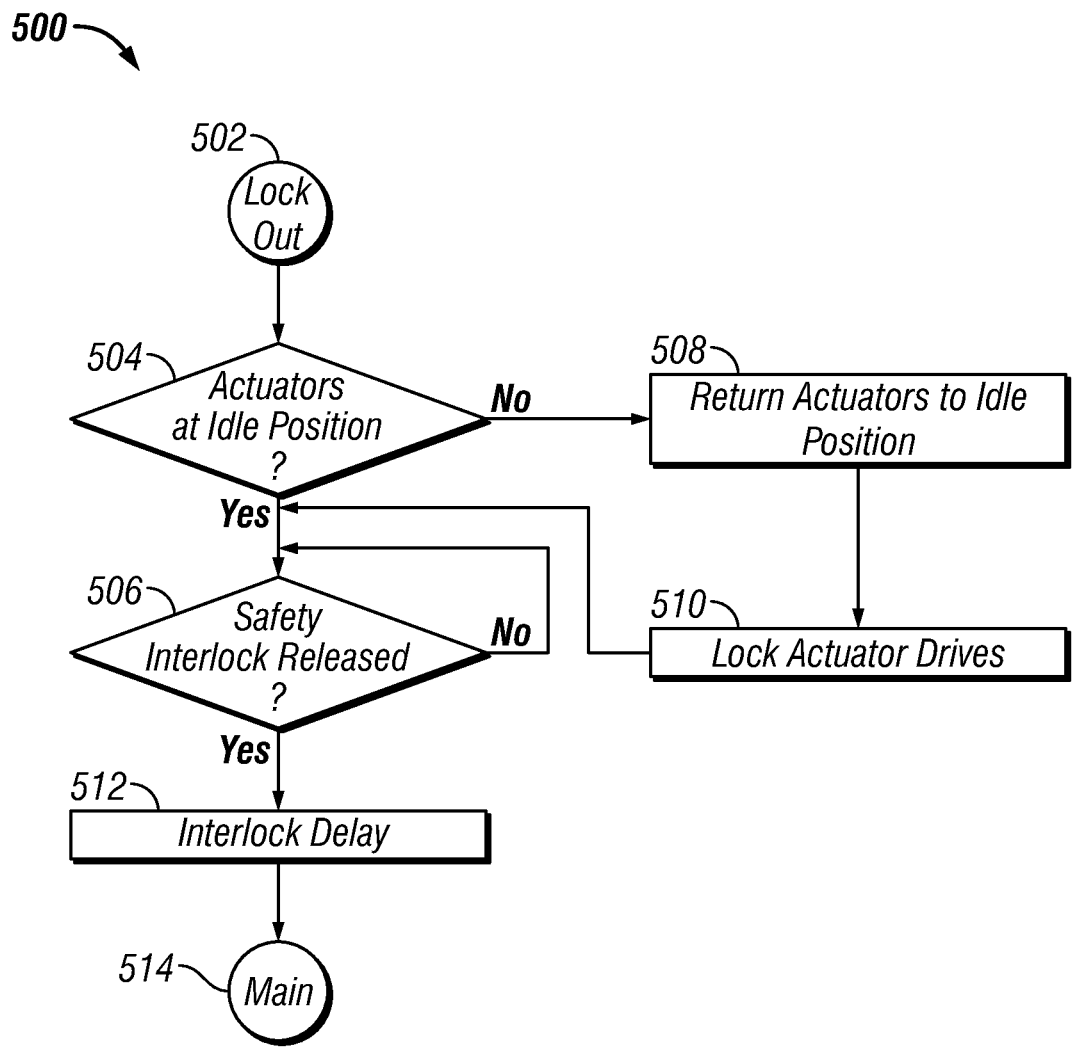
FIG. 5 is a flow diagram of an exemplary a safety interlock routine for use in a drive system, such as the system shown in FIG. 1, according to one embodiment of the disclosure.

FIG. 5 is a diagram of an embodiment of a safety interlock routine 500 for the drive system shown in FIG. 1. In one particular configuration, the safety interlock routine 500 is tripped when the interlock switch (132, FIG. 1) determines whether an operator is positioned on the vehicle seat. If the interlock switch determines that the operator is not on the seat, then the lock out procedure begins, as shown in Block 502. After determining that the operator is not on the seat, the system determines if the actuators are at an idle position (Block 504). In an embodiment, the idle position is the center position of the swash plate that causes no movement, either forward or reverse, in the corresponding wheel. The idle position may also be described as the neutral position. If the actuators are not in the idle position, the system returns the actuators to the idle position (Block 508). If the control system detects that the actuators have not or cannot reach their initial or home position, the control system can be configured to send a signal to stop the engine. After returning the actuators to the idle position, the actuator drives are locked in the idle position (Block 510). After either locking the actuator drives or determining that they are at an idle position, the system then checks whether the safety interlock has been released (Block 506). The safety interlock is released when the operator is positioned in the seat, causing the switch to release (not trip). If the safety interlock has not been released, the system continues to monitor the switch until the operator is in the seat. The actuators remain in idle position, meaning the wheels are not driven, until the interlock is released. Upon releasing the interlock, a delay is implemented, such as the three second delay shown in Block 512. The delay ensures the system does not immediately drive the wheels upon the operator sitting in the seat. After the delay has passed, in step 514 the routine proceeds to the main routine, as shown in FIG. 3.

It should be noted that the control system described herein may be utilized to control any member or device that is controllable by hydraulic power, such as fluid supplied under pressure by a pump.

Thus, in view of the above, a single-axis actuator may be used to drive each hydraulic pump valve or wash plate. A stroke-dependent internal potentiometer of such an actuator may be adjusted to provide a number of slope configurations, providing a variety of "feels" to the operator, via the input device. In one aspect, the actuator stroke is slightly longer than the stroke allowed on the hydraulic lever of the valve or swash plate to allow desired calibration and the swash plate may be mounted so that middle stroke of the actuator is the "off" or "idle" position of the hydraulic pump valve. In one aspect, the input device, such as the joystick, may be mounted in a way that provides movement to the operator that is related to a vehicle steering capability. When two joysticks are used, one joystick may be mounted on each side of the operator. A dual-axis joystick may be mounted proximate the operator but it is less limited to a specific location on the vehicle. In either case the mounting position allows the operator easy use of the joystick(s) without constraint. The control unit may be mounted anywhere on the vehicle, except in locations where additional moving parts may interfere with its operation. Feedback connections from each of the actuators and the joystick(s) are routed so that they have access to the control unit.

In operation, when a command signal from either of the joysticks is determined to be different from that previously commanded to the actuator, a software determines or selects the next position sequence where the actuators need to be located to provide a related wheel rpm to the vehicle. This position is compared to the previous position to determine the actuator speed needed to provide quick response while limiting the vehicle from erratic movements. After determining the speed and position needed, a pulse width modulation (PWM) signal, with increasing duty cycle, applies power to the actuator to increase or decrease the rpm of the wheel. The duty cycle ramping is stopped, and left as a constant duty cycle, when the desired actuator speed, calculated above, is met. When the actuator is nearing the desired position, the duty cycle of the actuator PWM signal reduces to a holding or steady value. This increases the positional accuracy of the actuator. The same technique is used in both the forward and reverse directions of the vehicle. Using the hydraulic zero RPM position as the center location for all readings, the controller can eliminate the need to differentiate between forward and reverse. If, while currently moving, the control receives a new command from one of the joysticks, the machine will recognize the request and re-calculate the position and speed requirements to meet the new command. This allows smooth transitions between continuously changing commanded positions.

In aspects, the user adjustable acceleration/speed control is also used to provide comfort and safety for operators. Changing this setting limits the stroke capability of the actuator, effectively limiting the maximum rpm to the wheels. This allows the operator to run the engine at full throttle, providing the fastest blade RPM speed, but limiting the machine's top speed. Also, in aspects, an electrical interlock system may be used to provide a degree of safety. When the controller recognizes this signal, the actuators, controlling wheel RPM, are commanded to move to the zero RPM position. During the fault condition, any commanded signals from the joysticks are disregarded and will not affect the rpm of the wheels. This error mode will continue until the interlock signal is removed from the controller for a specified amount of time, after which the above-noted control of the vehicle will return to the operator. In another aspect, an internal fault monitor may also be used to provide safety to the operator. If the control system receives an unrecognized command signal or if it is unable to provide the desired actuator movements an electrical interlock is triggered that can be used to either halt or remove power from the vehicle.

In other aspects, a system calibration routine may be initiated through the control system. When calibration is commanded, the actuators will begin to run to the stroke limits and the user can move the joystick(s) to their respective stroke limits. Moving the joy sticks to such position allows sufficient time for the control unit to return the actuators to their desired positions. At the end of this routine, the limits of stroke values are stored into the memory. These values are then used to calculate all commanded positions. Since the stroke is limited by what the hydraulic pump valves allow, previously established mechanical tolerances may be further limited.

The foregoing description is directed to certain embodiments for the purpose of illustration and explanation. It will be apparent, however, to persons skilled in the art that many modifications and changes to the embodiments set forth above may be made without departing from the scope and spirit of the concepts and embodiments disclosed herein. It is intended that the following claims be interpreted to embrace all such modifications and changes.

The invention claimed is:

1. An apparatus, comprising:
   a first hydraulic power unit for supplying a first fluid under pressure to a first chamber for controlling motion of a first movable member and a second hydraulic power unit for supplying a second fluid under pressure to a second chamber for controlling motion of a second movable member;
   an input device configured to provide an input signal for controlling the motions of the first and second movable members and a limit selector for setting a desired acceleration rate; and
   a processor configured to:
   receive the input signal from the input device;
   independently set, in response to the input signal and the desired acceleration rate from the input device and the limit selector, a first electrical actuator to accelerate at the desired acceleration rate to control an amount and flow rate of the first fluid to the first hydraulic power unit and a second electrical actuator to accelerate at the desired acceleration rate to control an amount and flow rate of the second fluid to the second hydraulic power unit for controlling the motion of the first and second movable members; and
   receive a first position signal from the first electrical actuator, and receive a second position signal from the second electrical actuator.

2. The apparatus of claim 1 wherein the first hydraulic power unit includes a first pump and the second hydraulic power unit includes a second pump.

3. The apparatus of claim 1 wherein the first and second movable members are selected from a group consisting of: wheels of a vehicle and movable arms.

4. The apparatus of claim 1 wherein the actuators are one of linear and non-linear electro-mechanical actuators.

5. The apparatus of claim 1, wherein the processor is configured to perform calibration of each of the first actuator and the second actuator.

6. The apparatus of claim 1, wherein the input device includes one of: a dual-axis joy stick, and a pair of single-axis joy sticks, wherein each of the first and second actuators corresponds to a combination of each axis of the pair of single-axis joysticks.

7. The apparatus of claim 1, wherein the processor is further configured to set a limit for stroke and rate of motion for each of the first actuator and second actuator.

8. The apparatus of claim 1, wherein each of the first actuator and second actuator is a stroke-dependent linear potentiometer configured to operate at a plurality of slope configurations.

9. The apparatus of claim 1 further comprising a safety interlock that moves from a first state to a second state upon occurrence of a selected condition relating to an operation of the apparatus and wherein the processor is configured to lock out operation of the first actuator and second actuator when the safety interlock is in the first state and allow operation of the first actuator and second actuator when the safety interlock is in the second state.

10. The apparatus of claim 9 wherein the processor is further configured to:
   determine a first speed and first position for the first actuator and a second position and second speed for the second actuator in response to the signal from the input device; and
   cause to operate the first actuator at the first speed to set the first actuator at the first position and the second actuator at the second speed to set the second actuator at the second position.

11. The apparatus of claim 1 further comprising a circuit configured to apply electrical power to the first actuator using a first pulse width modulation signal with an increasing duty cycle and apply electrical power to the second actuator using a second pulse width modulation signal with an increasing duty cycle.

12. The apparatus of claim 2, wherein: the first hydraulic power unit includes a first swash plate that controls the flow of the fluid to the first pump in response to position and speed of the first actuator and the second hydraulic power unit includes a second swash plate that controls the flow of the fluid to the second pump in response to position and speed of the second actuator.

13. A control system for controlling a pair of independently-operated hydraulic power devices, the control system comprising:
   an input device configured to provide an input signal relating to motion of a first movable member and a second movable member and a limit selector for setting a desired acceleration rate; and
   a processor configured to independently control, in response to the input signal and the desired acceleration rate, a first actuator to accelerate at the desired acceleration rate to control an amount and flow rate of a first fluid under pressure to a first chamber associated with a first hydraulic power device and control a second actuator to accelerate at the desired acceleration rate to control an amount and flow rate of a second fluid under pressure to a second chamber associated with a second hydraulic power device and receive a first position signal from the first actuator, and receive a second position signal from the second actuator.

14. The control system of claim 13 wherein the processor is further configured to perform calibration of each of the first actuator and the second actuator prior to controlling the first actuator and the second actuator based on a predefined calibration routine.

15. The control system of claim 13 wherein the processor is further configured to set a limit for stroke and rate of motion for each of the first actuator and second actuator based on a level selected by an operator or a code accessible to the processor.

16. The control system of claim 13 further comprising a safety interlock that moves from a first state to a second state upon occurrence of a selected event relating to an operation of at least one of the hydraulic power devices and wherein the processor is further configured to lock out operation of the first actuator and second actuator when the safety interlock is in the first state and allow operation of the first actuator and second actuator when the safety interlock is in the second state.

17. The control system of claim 13 wherein the processor is further configured to:
   determine a first speed and first position for the first actuator and a second position and second speed for the second actuator in response to the signal from the input device; and
   cause to operate the first actuator at the first speed to set the first actuator at the first position and the second actuator at the second speed to set the second actuator at the second position.

18. The control system of claim 13 further comprising a circuit configured to apply electrical power to the first actuator using a first pulse width modulation signal with an increasing duty cycle and apply electrical power to the second actuator using a second pulse width modulation signal with an increasing duty cycle.

19. A method of controlling a pair of independently-operated hydraulic power devices, the method comprising:
   providing an electrical input signal corresponding to a supply of a first hydraulic fluid under pressure to a first hydraulic power device and a supply of a second hydraulic fluid under pressure to a second hydraulic power device;
   providing a desired acceleration rate;
   independently controlling a first electro-mechanical actuator configured to accelerate at the desired acceleration rate to control an amount and flow rate of a first fluid to a first chamber associated with the first hydraulic power device and control a second electro-mechanical actuator to accelerate at the desire acceleration rate to control an amount and flow rate of a second fluid to a second chamber associated with the second hydraulic power device; and
   sensing a first position signal from the first electro-mechanical actuator, and a second position signal from the second electro-mechanical actuator.

20. The method of claim 19 further comprising:
   calibrating each of the first electro-mechanical actuator and the second electro-mechanical actuator prior to controlling the first electro-mechanical actuator and the second electro-mechanical actuator based on a predefined calibration routine;
   limiting stroke and rate of motion of each of the first electro-mechanical actuator and second electro-mechanical actuator based on a selected level; and
   locking out operation of the first electro-mechanical actuator and the second electro-mechanical actuator when a safety interlock is in a first state and allowing operation of the first electro-mechanical actuator and the second electro-mechanical actuator when the safety interlock is in a second state.

21. A control system for controlling a hydraulic power device, the control system comprising:
   an input device configured to provide an electrical input signal relating to motion of a movable member associated with the hydraulic power device and a desired acceleration rate; and
   a processor configured to control, in response to the electrical input signal, an actuator to accelerate at the desired acceleration rate control an amount and flow rate of a hydraulic fluid under pressure to a chamber associated with the hydraulic power device and receive a position signal from the actuator.

* * * * *